(12) United States Patent
Hasegawa et al.

(10) Patent No.: US 7,981,207 B2
(45) Date of Patent: Jul. 19, 2011

(54) DYE COMPOUND AND INK CONTAINING DYE COMPOUND

(75) Inventors: Waka Hasegawa, Kawasaki (JP);
Yasuaki Murai, Kawasaki (JP);
Masashi Hirose, Machida (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 12/472,701

(22) Filed: May 27, 2009

(65) Prior Publication Data
US 2009/0293765 A1 Dec. 3, 2009

(30) Foreign Application Priority Data

May 28, 2008 (JP) .................................. 2008-139677

(51) Int. Cl.
*C09D 11/02* (2006.01)
*C09B 29/36* (2006.01)

(52) U.S. Cl. ..................................... 106/31.48; 534/752
(58) Field of Classification Search ............... 106/31.48; 534/752
See application file for complete search history.

(56) References Cited

U.S. PATENT DOCUMENTS

| | | | | |
|---|---|---|---|---|
| 2,432,419 A * | 12/1947 | Heimbach | ...................... | 534/705 |
| 3,420,813 A * | 1/1969 | Otto et al. | ...................... | 534/752 |
| 3,847,919 A * | 11/1974 | Knowles et al. | .............. | 534/752 |
| 3,980,632 A * | 9/1976 | Henzi | ............................ | 534/610 |
| 4,367,173 A * | 1/1983 | Kanter | ........................... | 534/752 |
| 5,608,041 A * | 3/1997 | Schefczik et al. | .............. | 534/752 |
| 5,612,465 A * | 3/1997 | Schefczik et al. | .............. | 534/752 |
| 6,582,502 B2 * | 6/2003 | Fujiwara | ...................... | 106/31.48 |
| 6,723,835 B1 | 4/2004 | Millard | | |
| 6,855,195 B2 * | 2/2005 | Nishita et al. | ............... | 106/31.48 |
| 7,608,140 B2 * | 10/2009 | Link et al. | .................... | 106/31.48 |
| 2009/0293764 A1 * | 12/2009 | Hasegawa et al. | ............ | 106/31.48 |
| 2010/0089285 A1 * | 4/2010 | Shintou et al. | ............. | 106/31.48 |

FOREIGN PATENT DOCUMENTS

| | | |
|---|---|---|
| DE | 2623839 A1 | 12/1997 |
| JP | 37-006280 | 6/1963 |
| JP | 2003-510398 | 3/2003 |

OTHER PUBLICATIONS

The Chemical Society of Japan, Shin-jikken Kagaku Kouza 14—Yuuki Kagoubutu no Gousei to Hannou V, Maruzen, p. 2605.
Corwin Hansch, A. Leo, R.W. Taft, A Survey of Hammett Substituent Constants and Resonance and Field Parameters, Chem. Rev. 1991, 91, 165-195.

* cited by examiner

*Primary Examiner* — Helene Klemanski
(74) *Attorney, Agent, or Firm* — Canon U.S.A., Inc., IP Division (57) ABSTRACT

A dye compound represented by the following formula has at least one anionic group:

Formula (1)

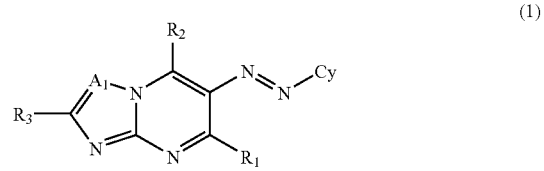

(1)

wherein $R_1$ and $R_2$ independently represent an amino or hydroxyl group, $A_1$ represents nitrogen or $CR_4$, $R_4$ and $R_3$ form a first aromatic ring, $R_3$ represents a substituent with a negative Hammett's substituent constant when $A_1$ represents nitrogen, and Cy represents a second aromatic ring.

12 Claims, 2 Drawing Sheets

DYE COMPOUND AND INK CONTAINING DYE COMPOUND

BACKGROUND OF THE INVENTION

1. Field of the Invention

The present invention relates to a dye compound and an ink containing the dye compound.

2. Description of the Related Art

Dyes used for ink jet recording liquids (inks) are usually water-soluble dyes; however, there is a problem in that images printed with inks containing the water-soluble dyes are inferior in storage stability. That is, the images have problems such as low light resistance and low gas resistance and therefore are discolored by light such as sunlight or illumination light or oxidizing gases, such as ozone, $NO_x$, and $SO_x$, slightly contained in air.

In order to solve the problems, PCT Japanese Translation Patent Publication No. 2003-510398 (hereinafter referred to as Patent Document 1) discloses a pyridone azo compound for use as an ink jet water-soluble dye.

Japanese Patent Publication No. 37-006280 (hereinafter referred to as Patent Document 2) discloses 6-phenylazo-5-triazolo[2,3-a]pyrimidine. Germany Patent No. 2623839 (hereinafter referred to as Patent Document 3) discloses a dye compound with a 3-aryl-4-hydroxy-2-oxopyrimido[2,1-b]benzoimidazole structure.

SUMMARY OF THE INVENTION

In particular, the present invention provides a dye compound, represented by the following formula, having at least one anionic group:

Formula (1)

(1)

wherein $R_1$ and $R_2$ independently represent an amino or hydroxyl group, $A_1$ represents nitrogen or $CR_4$, $R_4$ and $R_3$ form a first aromatic ring, $R_3$ represents a substituent with a negative Hammett's substituent constant when $A_1$ represents nitrogen, and Cy represents a second aromatic ring.

The present invention also provides an ink, containing the dye compound, for ink jet recording. Since the ink contains the dye compound, the ink has good storage stability and is useful in printing images having good light resistance and gas resistance.

Further features of the present invention will become apparent from the following description of exemplary embodiments with reference to the attached drawings.

DESCRIPTION OF THE EMBODIMENTS

Preferred embodiments of the present invention will now be described in detail.

According to studies conducted by the inventors, the water-soluble dye disclosed in Patent Document 1 does not meet recent requirements such as high weather resistance and light resistance. Furthermore, 6-phenylazo-5-triazolo[2,3-a]pyrimidine disclosed in Patent Document 2 is unstable in aqueous solution and therefore is unsuitable for use in ink jet inks. The dye compound, which has the 3-aryl-4-hydroxy-2-oxopyrimido[2,1-b]benzoimidazole structure, disclosed in Patent Document 1 is not water-soluble.

The inventors have conducted intensive studies to solve the above-mentioned problems. As a result, the inventors have found that a dye compound, represented by the following formula, having at least one anionic group is useful in printing an image having good light resistance and gas resistance:

Formula (1)

(1)

wherein $R_1$ and $R_2$ independently represent an amino or hydroxyl group, $A_1$ represents nitrogen or $CR_4$, $R_4$ and $R_3$ form a first aromatic ring, $R_3$ represents a substituent with a negative Hammett's substituent constant when $A_1$ represents nitrogen, and Cy represents a second aromatic ring. Furthermore, the inventors have found that the use of the dye compound can provide ink having good storage stability.

The dye compound, which is represented by Formula (1), is described below in detail.

In Formula (1), $R_1$ and $R_2$ independently represent the amino or hydroxyl group as described above. In particular, $R_1$ and $R_2$ preferably both represent the amino group or represent the amino group and the hydroxyl group, respectively, in view of the easiness of synthesis. The amino group may have a substituent. The substituent is not particularly limited as long as the substituent does not seriously impair the water solubility and storage stability of the dye compound. Examples of the substituent include alkyl groups such as a methyl group, an ethyl group, an n-propyl group, an isopropyl group, an n-butyl group, an isobutyl group, a sec-butyl group, and a tert-butyl group; aryl groups such as a phenyl group and a naphthyl group; aralkyl groups such as a benzyl group and a phenethyl; acyl groups such as an acetyl group and a benzoyl group; a mesyl group; a p-toluenesulfonyl group; a carbamoyl group; a sulfamoyl group; a triazinyl group; and a benzothiazolyl group. The amino group is preferably an unsubstituted amino group, an N-methylamino group, an N-ethylamino group, an N-benzylamino group, an N,N-dimethylamino group, an N,N-diethylamino group, an N-acetylamino group, an N-triazinylamino group, or the like in view of the easiness of synthesis and the water solubility of the dye compound.

In Formula (1), $A_1$ represents nitrogen or $CR_4$ and $R_4$ and $R_3$ form the first aromatic ring as described above. The first aromatic ring may have a substituent. This substituent is not particularly limited as long as this substituent does not seriously impair the water solubility and storage stability of the dye compound. This substituent is preferably a sulfo group. This is because the dye compound has increased water solubility, which leads to an increase in ink stability.

In Formula (1), when $A_1$ represents nitrogen, $R_3$ represents the substituent with the negative Hammett's substituent constant as described above.

Hammett's rule is an empirical rule proposed by L. P. Hammett in 1935 for the purpose of quantitatively discussing the influence of substituents on reactions or equilibria of benzene derivatives. The validity of Hammett's rule is nowadays widely accepted. Hammett's substituent constants can be found in many literatures. Details are given in, for example, Inamoto, N., *Hammett Soku—Kozo to Hannousei*, Maruzen; The Chemical Society of Japan, *Shin-jikken Kagaku Kouza* 14—*Yuuki Kagoubutu no Gousei to Hannou* V, Maruzen, p. 2605; Nakaya, T., *Riron Yuuki Kagaku Kaisetu*, Tokyo Kagaku Dozin, p. 217; and *Chem. Rev.*, 91, 165 (1991). Substituents used herein are characterized by the Hammett's substituent constants $\sigma_p$ thereof in some cases. However, it should not be construed that these substituents are limited to those whose Hammett's substituent constants are described in any of the above literatures. Any substituent with an unknown Hammett's substituent constant is within the scope of the present invention if the Hammett's substituent constant thereof is determined to be within the range defined herein on the basis of Hammett's rule. Examples of the substituent with the negative Hammett's substituent constant include alkoxy groups such as a methoxy group, which has a Hammett's substituent constant of −0.27, an ethoxy group, which has a Hammett's substituent constant of −0.24, a phenoxy group, which has a Hammett's substituent constant of −0.32, and a benzyloxy group, which has a Hammett's substituent constant of −0.42; amino groups such as an amino group, which has a Hammett's substituent constant of −0.66, a methylamino group, which has a Hammett's substituent constant of −0.70, a dimethylamino group, which has a Hammett's substituent constant of −0.83, an ethylamino group, which has a Hammett's substituent constant of −0.61, a diethylamino group, which has a Hammett's substituent constant of −0.72, a butylamino group, which has a Hammett's substituent constant of −0.51, a phenylamino group, which has a Hammett's substituent constant of −0.56, and a hydroxylamino group, which has a Hammett's substituent constant of −0.34; a hydrazino group, which has a Hammett's substituent constant of −0.55; a ureido group, which has a Hammett's substituent constant of −0.24; and a hydroxyl group, which has a Hammett's substituent constant of −0.37.

In Formula (1), $R_3$ is preferably an amino group when $A_1$ is nitrogen. This is because inks containing the dye compound, which is represented by Formula (1), have increased storage stability. This amino group may have a substituent. The substituent of this amino group is not particularly limited as long as the substituent of this amino group does not seriously impair the water solubility and storage stability of the dye compound. Examples of the substituent of this amino group include alkyl groups such as a methyl group, an ethyl group, an n-propyl group, an isopropyl group, an n-butyl group, an isobutyl group, a sec-butyl group, and a tert-butyl group; aryl groups such as a phenyl group and a naphthyl group; aralkyl groups such as a benzyl group and a phenethyl; acyl groups such as an acetyl group and a benzoyl group; a mesyl group; a p-toluenesulfonyl group; a carbamoyl group; a sulfamoyl group; a triazinyl group; and a benzothiazolyl group. This amino group is preferably an unsubstituted amino group, an N-methylamino group, an N-ethylamino group, an N-benzylamino group, an N,N-dimethylamino group, an N,N-diethylamino group, an N-acetylamino group, an N-triazinylamino group, or the like in view of the easiness of synthesis and the water solubility of the dye compound.

In Formula (1), Cy represents the second aromatic ring, which is substituted or unsubstituted. The second aromatic ring is not particularly limited. Examples of the second aromatic ring include aromatic hydrocarbon groups such as a phenyl group and a naphthyl group and heteroaromatic groups such as an imidazolyl group, a thiazolyl group, an oxazolyl group, a pyrrolyl group, an oxadiazolyl group, a thiadiazolyl group, a pyrazolyl group, a 1,2,3-triazolyl group, a 1,2,4-triazolyl group, a furyl group, a thienyl group, a pyridyl group, a pyrimidinyl group, a pyrazinyl group, a pyridazinyl group, a benzimidazolyl group, and a dibenzothiazolyl group. The second aromatic ring may have a substituent such as an alkyl group, a carboxyl group, or a sulfo group. The second aromatic ring preferably has a carboxyl or sulfo group, because the dye compound has increased solubility in aqueous solvents. The second aromatic ring preferably has an azo group adjacent to the carboxyl or sulfo group, because the dye compound has better gas resistance. The second aromatic ring is preferably a nitrogen-containing heteroaromatic ring and more preferably a five-membered nitrogen-containing heteroaromatic ring in view of light resistance.

The dye compound has at least one anionic group as described above. Examples of the anionic group include a carboxyl group, a sulfo group, and a phospho group. In particular, the anionic group is preferably a carboxyl or sulfo group in view of the easiness of synthesis. Furthermore, examples of the anionic group include groups lacking hydrogen ions and groups attached to counter ions. Preferred examples of the counter ions include alkali metal ions such as lithium ions, sodium ions, and potassium ions and quaternary ammonium ions such as ammonium ions, methylammonium ions, dimethylammonium ions, trimethylammonium ions, tetramethylammonium ions, ethylammonium ions, diethylammonium ions, triethylammonium ions, tetraethylammonium ions, n-propylammonium ions, isopropylammonium ions, diisopropylammonium ions, n-butylammonium ions, tetra-n-butylammonium ions, isobutylammonium ions, monoethanol ammonium ions, diethanol ammonium ions, and triethanol ammonium ions.

The dye compound, which is represented by Formula (1), has tautomers each represented by Formula (1') or (1") below. The term "dye compound" as used herein covers the tautomers represented by Formula (1') or (1").

In Formulas (1') and (1"), $R_1'$ and $R_2'$ independently represent an imino or carbonyl group that may have a substituent and $R_1$, $R_2$, $R_3$, $A_1$, and Cy are the same as those in Formula (1).

A method for producing the dye compound will now be described. The dye compound is preferably produced through two steps below. In a first step, an aromatic amine and a first compound are subjected to condensation in the presence or absence of a solvent, whereby a second compound is obtained. In this step, an appropriate condensation agent may be used. The aromatic amine is represented by the following formula:

Formula (2)

(2)

wherein $A_1$ and $R_3$ are the same as those in Formula (1). The first compound is represented by the following formula:

Formula (3)

$Q_1\text{-}CH_2\text{-}Q_2$ (3)

wherein $Q_1$ and $Q_2$ independently represent a cyano or alkoxycarbononyl group.

The second compound is represented by the following formula:

Formula (4)

(4)

wherein $A_1$ and $R_1$ to $R_3$ are the same as those in Formula (I).

In a second step subsequent to the first step, the second compound is coupled with an aniline derivative having a diazo component, whereby the dye compound is produced. The aniline derivative is represented by the following formula:

Formula (5)

Cy-NH$_2$ (5)

wherein Cy is the same as that in Formula (1).

$R_1$ and $R_2$ in Formula (4) depend on $Q_1$ and $Q_2$ in Formula (3). That is, when $Q_1$ and $Q_2$ are both alkoxycarbononyl groups, $R_1$ and $R_2$ are both hydroxyl groups. When $Q_1$ and $Q_2$ are both cyano groups, $R_1$ and $R_2$ are both amino groups.

In the first step, condensation is carried out in such a manner that the aromatic amine and the first compound are heated in the absence of any solvent or in the presence of a solvent such as methanol, ethanol, or glacial acetic acid or a mixture of methanol, ethanol, and glacial acetic acid under reflux. The amount of the solvent or mixture used is not particularly limited and is preferably 100 times or less of that of the aromatic amine on a mass basis. The condensation agent may be used in this step. Examples of the condensation agent include a sodium alkoxide, piperidine, and triethylamine.

In the second step, coupling can be carried out by a known process. That is, in the second step, the second compound is coupled with the aniline derivative, whereby the dye compound is obtained. A process for coupling the second compound with the aniline derivative is as follows: for example, the aniline derivative is converted into a diazonium salt by allowing the aniline derivative to react with a nitrite such as sodium nitrite in the presence of an inorganic acid such as hydrochloric acid or sulfuric acid and the diazonium salt is coupled with the second compound, whereby the dye compound is produced.

The final product obtained through the above steps is treated by a post-treatment technique for common organic synthesis reactions and then purified. The resulting product can be used for intended purposes.

The dye compound can be produced by the above method. Examples of the dye compound include, but are not limited to, those shown in Tables 1 and 2. A typical example of the dye compound is a compound represented by the following formula:

Formula (1a)

(1a)

Another typical example of the dye compound is a compound represented by the following formula:

Formula (1b)

(1b)

Examples of the compound represented by Formula (1a) are shown in Table 1 and examples of the compound represented by Formula (1b) are shown in Table 2.

TABLE 1

| Compounds | $R_1$ | $R_2$ | $R_5$ | $R_6$ | $R_7$ | $R_8$ | Cy |
|---|---|---|---|---|---|---|---|
| 1a-1 | —OH | —OH | —H | —H | —H | —H | 4-methyl-3-carboxylate-benzenesulfonate (Na salts) |
| 1a-2 | —OH | —OH | —H | One of $R_6$ and $R_7$ is —SO$_3$Na and the other is —H. | | —H | 4-methyl-3-carboxylate-benzenesulfonate (Na salts) |
| 1a-3 | —OH | —OH | —H | One of $R_6$ and $R_7$ is —NO$_2$ and the other is —H. | | —H | 4-methyl-3-carboxylate-benzenesulfonate (Na salts) |
| 1a-4 | —OH | —OH | —H | One of $R_6$ and $R_7$ is —NH$_2$ and the other is —H. | | —H | 4-methyl-3-carboxylate-benzenesulfonate (Na salts) |
| 1a-5 | —OH | —OH | —H | —CH$_3$ | —CH$_3$ | —H | 4-methyl-3-carboxylate-benzenesulfonate (Na salts) |
| 1a-6 | —OH | —OH | —H | —H | —H | —H | 2-methylbenzothiazole-6-sulfonate (Na salt) |

TABLE 1-continued

| Compounds | $R_1$ | $R_2$ | $R_5$ | $R_6$ | $R_7$ | $R_8$ | Cy |
|---|---|---|---|---|---|---|---|
| 1a-7 | —OH | —OH | —H | —H | —H | —H | 3,5-dimethyl-1-(3-sulfonatophenyl)pyrazole |
| 1a-8 | —OH | —OH | —H | —H | —H | —H | sodium 3-methylpyridine-2-carboxylate |
| 1a-9 | —OH | —OH | —H | —H | —H | —H | sodium 2-methylbenzoate |
| 1a-10 | —OH | —OH | —H | —H | —H | —H | sodium 3-methylbenzoate |
| 1a-11 | —OH | —OH | —H | —H | —H | —H | sodium 4-methylbenzoate |
| 1a-12 | —OH | —OH | —H | —H | —H | —H | sodium 2-methyl-5-sulfonatobenzoate |
| 1a-13 | —OH | —OH | —H | One of $R_6$ and $R_7$ is —SO$_3$Na and the other is —H. | | —H | sodium 2-methyl-5-sulfonatobenzoate |
| 1a-14 | —OH | —OH | —H | One of $R_6$ and $R_7$ is —NO$_2$ and the other is —H. | | —H | sodium 2-methyl-5-sulfonatobenzoate |

TABLE 1-continued

| Compounds | R₁ | R₂ | R₅ | R₆ | R₇ | R₈ | Cy |
|---|---|---|---|---|---|---|---|
| 1a-15 | —OH | —OH | —H | One of R₆ and R₇ is —NH₂ and the other is —H. | | —H | 2-methyl-5-sulfonato-benzoate sodium salt |

TABLE 2

| Compounds | R₁ | R₂ | R₃ | Cy |
|---|---|---|---|---|
| 1b-1 | —OH | —OH | —NH₂ | 2-methyl-5-(SO₃Na)-benzoate ONa |
| 1b-2 | —OH | —OH | —NHCOCH₃ | 2-methyl-5-(SO₃Na)-benzoate ONa |
| 1b-3 | —OH | —OH | —NH₂ | 2-methylbenzoate ONa |
| 1b-4 | —OH | —OH | —NH₂ | 3-methylbenzoate ONa |
| 1b-5 | —OH | —OH | —NH₂ | 4-methylbenzoate ONa |
| 1b-6 | —OH | —OH | —NH₂ | 1-(3-sulfonatophenyl)-3,5-dimethylpyrazole |
| 1b-7 | —OH | —OH | —NH₂ | 2-methyl-6-sulfonato-benzothiazole |

TABLE 2-continued

| Compounds | R₁ | R₂ | R₃ | Cy |
|---|---|---|---|---|
| 1b-8 | —OH | —OH | —NH₂ | 3-methyl-pyridine-2-carboxylate sodium |
| 1b-9 | —OH | —NH₂ | —NH₂ | 2-methyl-5-sulfo(Na)-benzoate sodium |
| 1b-10 | —OH | —NH₂ | —NH₂COCH₃ | 2-methyl-5-sulfo(Na)-benzoate sodium |
| 1b-11 | —OH | —NH₂ | —NH₂ | 1-(3-sulfo(Na)phenyl)-3,5-dimethylpyrazole |
| 1b-12 | —OH | —OH | —OH | 2-methyl-5-sulfo(Na)-benzoate sodium |
| 1b-13 | —OH | —OH | —OCH₃ | 2-methyl-5-sulfo(Na)-benzoate sodium |
| 1b-14 | —OH | —OH | —OC₂H₅ | 2-methyl-5-sulfo(Na)-benzoate sodium |
| 1b-15 | —OH | —OH | —NH-(4,6-dihydroxy-1,3,5-triazin-2-yl) | 2-methyl-5-sulfo(Na)-benzoate sodium |

Identification Techniques

Obtained reaction products can be identified by several techniques using a $^1$H and $^{13}$C nuclear magnetic resonance spectrometer, ECA-400, available from JOEL Ltd.; a high performance liquid chromatograph, LC-20A, available from Shimadzu Corporation; an LC/TOF mass spectrometer, LC/MSD TOF, available from Agilent Technologies; and a UV-V is spectrophotometer, U-3310, available from Hitachi, Ltd.

Ink

The dye compound has a vivid color tone and good spectroscopic properties and therefore can be used for various colorants such as yellow colorants, magenta colorants, and black colorants and materials for recording image information. In particular, the dye compound is suitable for use in ink jet inks and printing inks and is suitable for use as a material (colorant) for paints or writing inks.

An ink according to the present invention contains the dye compound and is suitable for use as an ink jet ink. A method for producing the ink will now be described. An ink composition that can be used as the ink can be produced in such a manner that the dye compound is dissolved and/or dispersed in a liquid medium. The liquid medium is preferably an aqueous medium. Preferred examples of the aqueous medium include water and a mixture of water and a water-soluble organic solvent. The water-soluble organic solvent is not particularly limited. Examples of the water-soluble organic solvent include alcohols, polyalcohols, polyglycols, glycol ethers, nitrogen-containing polar solvents, and sulfur-containing polar solvents. The content of the water-soluble organic solvent in the ink is preferably 1% to 40% by mass and more preferably 3% to 30% by mass in consideration of moisture-retaining properties of the ink, the ability of the ink to dissolve a colorant, and the effective penetration of the ink into recording paper. The content of water in the ink is preferably 30% to 95% by mass. This allows a colorant containing the dye compound to be well dispersed or dissolved in the ink. In particular, this allows the ink to have a viscosity suitable for stable ink ejection and prevents nozzles from being clogged in the case where the ink is used for ink jet recording.

In the case where the ink is designated for ink jet use, the amount of the dye compound used is preferably 0.2 to 10 parts and more preferably 0.2 to five parts per 100 parts of the ink on a mass basis in consideration of the storage stability of the ink and the graininess of recorded images.

The ink may further contain a chemically synthesized surfactant such as an ionic surfactant, a nonionic surfactant, or a polymeric surfactant; a natural product; and/or a naturally derived surfactant prepared by reforming the natural product with an enzyme or the like. These surfactants and the natural product may be used alone or in combination. The content of at least one of these surfactants and the natural product in the ink is preferably 0.5% to 20% by mass for the purpose of maintaining the dispersion stability of the dye compound well.

These surfactants and the natural product are not particularly limited. Examples of the ionic surfactant include anionic surfactants such as aliphatic monocarboxylates, polyoxyethylene alkyl ether carboxylates, N-acyl sarcosinates, N-acyl glutamates, dialkyl sulfosuccinates, alkanesulfonates, alpha-olefin sulfonates, linear alkylbenzene sulfonates, branched alkylbenzene sulfonates, naphthalene sulfonate-formaldehyde condensates, alkylnaphthalenesulfonates, N-methyl-N-acyl taurates, alkylsulfonates, polyoxyethylene alkyl ether sulfonates, oil sulfonates, alkylphosphonates, polyoxyethylene alkyl ether phosphonates, polyoxyethylene alkylphenyl ether phosphonates; cationic surfactants such as alkyl amines, alkyl trimethyl ammonium chlorides, alkyl trimethyl ammonium bromides, alkyl trimethyl ammonium iodides, dialkyl dimethyl ammonium chlorides, dialkyl dimethyl ammonium bromides, dialkyl dimethyl ammonium iodides, alkylbenzalkonium chlorides, and alkylpyridinium chlorides; and amphoteric surfactants such as alkyl betaines, fatty acid amido propyl betaines, 2-alkyl-N-carboymethyl-N-hydroxyethyl imidazolinium betaines, alkyl diethylene triamino acetic acids, dialkyl diethylene triamino acetic acids, and alkylamine oxides. Examples of the nonionic surfactant include glycerin fatty acid esters, sorbitan fatty acid esters, sugar fatty acid esters, polyoxyethylene alkyl ethers, polyoxyethylene alkylphenyl ethers, polyoxyethylene polyoxypropylene glycols, polyethylene glycol fatty acid esters, polyethylene sorbitan fatty acid esters, and fatty acid alkanolamides.

Examples of the polymeric surfactant include anionic polymeric surfactants such as polymethacrylates, styrene-acrylate copolymers, vinylnaphthalene-acrylate copolymers, styrene-maleate copolymers, vinylnaphthalene-maleate copolymers, and polyphosphates and nonionic polymeric surfactants such as polyvinyl alcohols, polyvinylpyrrolidones, and polyalkylene glycols.

Examples of the natural product include proteins such as gelatin and casein, natural rubbers such as gum arabic, saponins such as glucoside, natural polymers such as shellac, and lecithin. Examples of the naturally derived surfactant include cellulose derivatives such as alkyl celluloses, carboxyalkyl celluloses, hydroxyalkyl celluloses; lignin sulfonates; and food surfactants such as enzyme-degraded lecithin.

The pH of the ink, which is produced using the dye compound, is not particularly limited. When the pH thereof is 4.0 to 11.0, the ink is readily handled. In the case where the ink is produced for ink jet purposes, the ink may contain a moisture-retaining solid such as urea, a urea derivative, or trimethylolpropane. The content of the moisture-retaining solid in the ink is preferably 0.1% to 20.0% and more preferably 3.0% to 10.0% on a mass basis.

The ink may further contain a pH adjustor, a rust preventive, a preservative, an antimildew agent, an antioxidant, an antireductant, an evaporation accelerator, a chelating agent, a water-soluble polymer, and/or another additive other than the above components as required.

The ink, which is prepared using the dye compound as described above, is particularly suitable for use in ink jet recoding processes in which droplets are ejected by the action of thermal energy. Furthermore, the ink is suitable for use in ink jet recoding processes other than those described above and is suitable for use as a material for common writing tools. The dye compound can be used for electronic materials such as dyes for optical recording and dyes for color filters in addition to colorant purposes.

EXAMPLES

The present invention will be further described in detail with reference to examples and comparative examples. However, the present invention is not limited to the examples. All "parts" and "percentages" referred to herein are on a mass basis unless otherwise specified.

Example 1

Dye Compounds 1a-1, 1a-12, and 1b-12 that were examples of a dye compound, represented by Formula (1), according to the present invention were produced as described below.

Synthesis Experiment 1

In Synthesis Experiment 1, Compound 6 represented by the following formula was produced as described below:

Formula (6)

(6)

The following compounds were mixed with 100 mL of ethanol: 5.0 g of 2-aminobenzimidazole, 6.0 g of diethyl malonate, and 5.1 g of sodium ethoxide. The mixture was subjected to reflux for four hours. After the mixture was cooled, precipitated crystals were separated from the mixture by filtration and then washed with 1.0 M hydrochloric acid. The resulting crystals were dried, whereby 7.2 g of Compound 6 was obtained in the form of white powder.

Synthesis Experiment 2 (Production of Dye Compound 1a-1)

In Synthesis Experiment 2, Dye Compound 1a-1 represented by the following formula was produced as described below:

Formula (1a-1)

(1a-1)

The following compounds were mixed with 200 mL of water: 15 g of 5-sulfoanthranilic acid and 7.1 g of 35% hydrochloric acid. The mixture was cooled to 5° C. or lower. The cooled mixture was mixed with 5.2 g of sodium nitrite for one hour. An excess of sodium nitrite in this mixture was decomposed with 2.0 g of amidosulfuric acid, whereby a diazotization liquid was obtained. On the other hand, 7.2 g of Compound 6, which was obtained in Synthesis Experiment 1, and 100 mL of pyridine were mixed together and then cooled to 5° C. or lower, whereby a suspension was obtained. The diazotization liquid was slowly added dropwise to the suspension. This mixture was stirred for eight hours, whereby crystals were precipitated. The crystals were separated from this mixture by filtration and then sufficiently washed with ethanol. The resulting crystals were dispersed in 200 mL of water. The dispersion was neutralized with a 1.0 M solution of sodium hydroxide in water, whereby the crystals were dissolved in water. The obtained aqueous solution was desalted by electric dialysis and then dried, whereby 16 g of Dye Compound 1a-1 was obtained in the form of yellow powder. The structure of Dye Compound 1a-1 was determined by NMR analysis, mass spectrometry, HPLC analysis, and UV-Vis spectrometry using the above-mentioned instruments. Obtained results are described below.

Analysis Results of Dye Compound 1a-1

Figure 1:
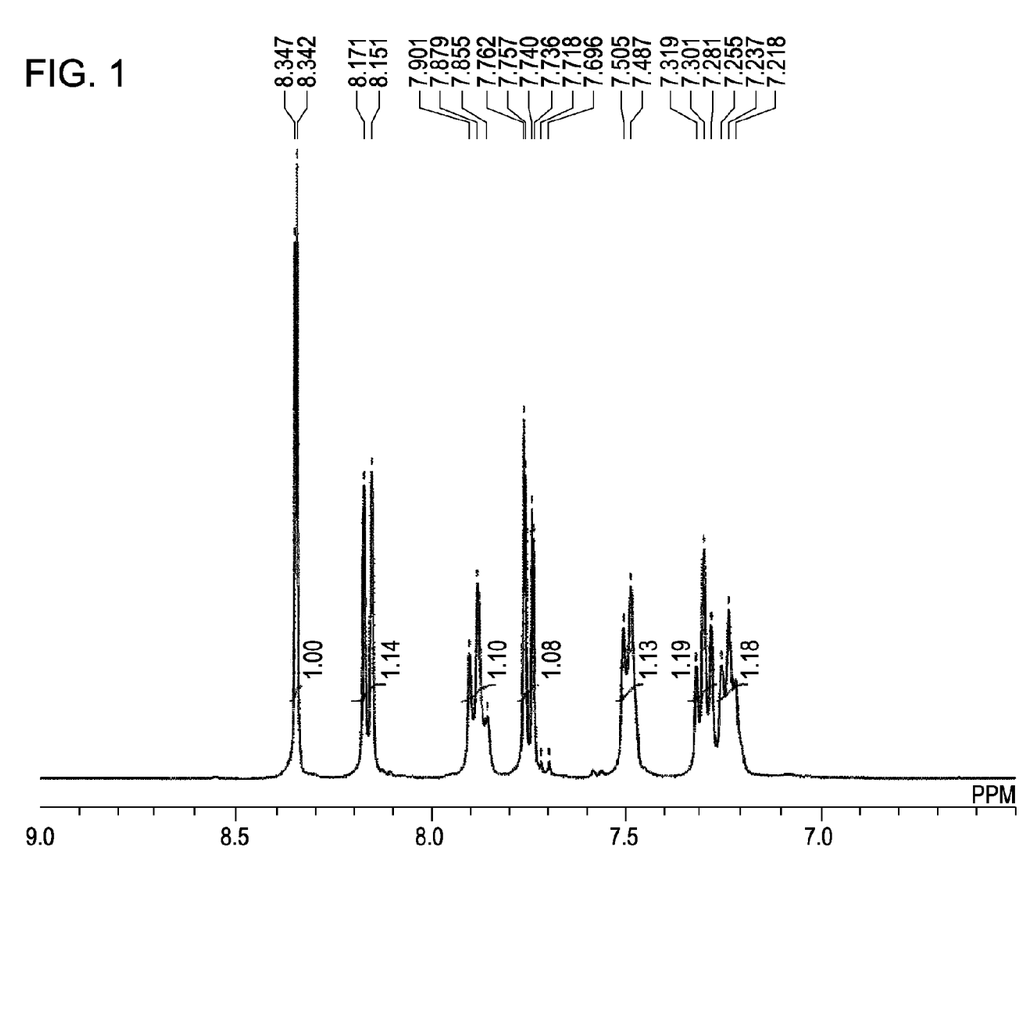
FIG. 1 is a graph showing the $^1$H NMR spectrum of Dye Compound 1a-1 in DMSO-$d_6$ at 24° C. and a frequency of 400 MHz, Dye Compound 1a-1 being an example of a dye compound according to the present invention.

(1) Results of $^1$H NMR Analysis (400 MHz, DMSO-$d_6$, 24° C.) in FIG. 1

δ (ppm): 7.24 (t, 1H), 7.30 (t, 1H), 7.50 (d, 1H), 7.75 (dd, 1H), 7.89 (d, 1H), 8.16 (d, 1H), 8.34 (d, 1H)

(2) Results of $^{13}$C NMR Analysis (100 MHz, DMSO-$d_6$, 24° C.)

δ (ppm): 114.1, 114.3, 117.1, 119.0, 122.2, 124.4, 124.9, 128.7, 128.9, 129.8, 141.5, 143.4, 144.3, 148.0, 157.2, 160.8, 169.0

(3) Results of Mass Spectrometry (ESI-TOF)

m/z: 450.01 (M-Na)$^-$, 213.68 (M−2Na)$^{2-}$, (4) Results of HPLC Analysis (0.1 mM TFA Solution-MeOH)

Purity: 97.2% (area percent)

Retention time: 14.2 minutes (5) Results of UV-Vis Spectrometry (Solvent: $H_2O$, 23° C.)

λmax: 408.5 nm

ε: 37197 $M^{-1}$ $cm^{-1}$

Synthesis Experiment 3

In Synthesis Experiment 3, Compound 7 represented by the following formula was produced as described below:

Formula (7)

(7)

The following compounds were mixed together: 5.0 g of 2-aminobenzimidazole and 20 g of ethyl cyanoacetate. The mixture was heated at 150° C. for two hours. After the mixture was cooled, precipitated crystals were separated from the mixture by filtration and then washed with 1.0 M hydrochloric acid. The resulting crystals were dried, whereby 7.0 g of Compound 7 was obtained in the form of white powder.

Synthesis Experiment 4 (Production of Dye Compound 1a-12)

In Synthesis Experiment 4, Compound 1a-12 represented by the following formula was produced as described below:

Formula (1a-12)

(1a-12)

The following compounds were mixed with 200 mL of water: 15 g of 5-sulfoanthranilic acid and 7.3 g of 35% hydrochloric acid. The mixture was cooled to 5° C. or lower. The cooled mixture was mixed with 5.3 g of sodium nitrite for one hour. An excess of sodium nitrite in this mixture was decomposed with 2.0 g of amidosulfuric acid, whereby a diazotization liquid was obtained. On the other hand, 7.0 g of Compound 7, which was obtained in Synthesis Experiment 3, and 100 mL of pyridine were mixed together and then cooled to 5° C. or lower, whereby a suspension was obtained. The diazotization liquid was slowly added dropwise to the suspension. This mixture was stirred for eight hours, whereby crystals were precipitated. The crystals were separated from this mixture by filtration and then sufficiently washed with ethanol. The resulting crystals were dispersed in 200 mL of water. The dispersion was neutralized with a 1.0 M solution of sodium hydroxide in water, whereby the crystals were dissolved in water. The obtained aqueous solution was desalted by electric dialysis and then dried, whereby 15 g of Dye Compound

1a-12 was obtained in the form of yellow powder. The structure of Dye Compound 1a-12 was determined by NMR analysis, mass spectrometry, HPLC analysis, and UV-Vis spectrometry using the above-mentioned instruments. Obtained results are described below.

Analysis results of Dye Compound 1a-12
(1) Results of $^1$H NMR Analysis (400 MHz, DMSO-$d_6$, 24° C.) in FIG. 1
    δ (ppm): 7.04 (t, 1H), 7.16 (t, 1H), 7.55 (d, 1H), 7.65 (dd, 1H), 8.02 (d, 1H), 8.31 (d, 1H), 8.40 (d, 1H), 9.20 (s, 1H)
(2) Results of $^{13}$C NMR Analysis (100 MHz, DMSO-$d_6$, 24° C.)
    δ (ppm): 113.15, 114.52, 116.53, 118.71, 120.23, 122.41, 123.08, 128.54, 129.94, 131.07
(3) Results of Mass Spectrometry (ESI-TOF)
    m/z: 449.03 (M-Na)$^-$, 213.18 (M-2Na)$^{2-}$,
(4) Results of HPLC Analysis (0.1 mM TFA Solution-MeOH)
    Purity: 95.7% (area percent)
    Retention time: 13.2 minutes
(5) Results of UV-Vis Spectrometry (Solvent: $H_2O$, 23° C.)
    λmax: 403.0 nm
    ε: 26488 M$^{-1}$ cm$^{-1}$ Synthesis Experiment 5

In Synthesis Experiment 5, Compound 8 represented by the following formula was produced as described below:

Formula (8)

(8)

The following compounds were mixed with 100 mL of ethanol: 5.0 g of 3,5-diamino-1,2,4-triazole, 8.1 g of diethyl malonate, and 6.9 g of sodium ethoxide. The mixture was subjected to reflux for four hours. After being cooled, the mixture was slowly added dropwise to 100 mL of water and then neutralized with 35% hydrochloric acid, whereby crystals were precipitated. The crystals were separated from the mixture by filtration, sufficiently washed with water, and then dried, whereby 5.1 g of Compound 8 was obtained in the form of white powder.

Synthesis Experiment 6 (Production of Dye Compound 1b-1)

In Synthesis Experiment 6, Compound 1b-1 represented by the following formula was produced as described below:

Formula (1b-1)

(1b-1)

The following compounds were mixed with 100 mL of water: 6.6 g of 5-sulfoanthranilic acid and 3.2 g of 35% hydrochloric acid. The mixture was cooled to 5° C. or lower. The cooled mixture was mixed with 2.3 g of sodium nitrite for one hour. An excess of sodium nitrite in this mixture was decomposed with 0.88 g of amidosulfuric acid, whereby a diazotization liquid was obtained. On the other hand, 5.1 g of Compound 8, which was obtained in Synthesis Experiment 5, 6.5 g of sodium carbonate, and 100 mL of water were mixed together and then cooled to 5° C. or lower, whereby a suspension was obtained. The diazotization liquid was slowly added dropwise to the suspension. This mixture was stirred for two hours and then subjected to acid precipitation, whereby crystals were precipitated. The crystals were separated from this mixture by filtration and then dispersed in 200 mL of water. The dispersion was neutralized with a 1.0 M solution of sodium hydroxide in water, whereby the crystals were dissolved in water. The obtained aqueous solution was desalted by electric dialysis and then dried, whereby 12 g of Dye Compound 1b-1 was obtained in the form of yellow powder. The structure of Dye Compound 1b-1 was determined by NMR analysis, mass spectrometry, HPLC analysis, and UV-Vis spectrometry using the above-mentioned instruments. Obtained results are described below.

Analysis Results of Dye Compound 1b-1
(1) Results of $^1$H NMR Analysis (400 MHz, DMSO-$d_6$, 23° C.) in FIG. 1
    δ (ppm): 8.30 (d, 1H), 7.80 (d, 1H), 7.64 (dd, 1H), 5.64 (s, 2H)
(2) Results of $^{13}$C NMR Analysis (100 MHz, $D_2O$, 24° C.)
    δ (ppm): 119.3, 123.6, 127.0, 131.5, 132.0, 132.1, 141.7, 146.3, 159.0, 167.2, 174.8, 183.9
(3) Results of Mass Spectrometry (ESI-TOF)
    m/z: 416.00 (M-Na)$^-$, 196.51 (M-2Na)$^{2-}$,
(4) Results of HPLC Analysis (0.1 mM TFA Solution-MeOH)
    Purity: 99.0% (area percent)
    Retention time: 4.9 minutes
(5) Results of UV-Vis Spectrometry (Solvent: $H_2O$, 23° C.)
    λmax: 404.0 nm
    ε: 26532 M$^{-1}$ cm$^{-1}$ Example 2

Ink Preparation Experiment 1

Ink A was prepared in such a manner that the following components were weighed so as to total 100 parts and were mixed together and the mixture was sufficiently stirred: 3.5 parts of Dye Compound 1a-1; one part of an acetylene glycol-ethylene oxide adduct, Acetylenol EH, available from Kawaken Fine Chemicals Co., Ltd.; 7.5 parts of ethylene glycol; 7.5 parts of glycerin; and 7.5 parts of urea, the remainder being ion-exchanged water.

Ink Preparation Experiments 2 to 11

Inks B to K were prepared in the same manner as that described in Ink Preparation Experiment 1 except that Dye Compounds 1a-2, 1a-5, 1a-6, 1a-9, 1a-10, 1a-11, 1a-12, 1b-1, 1b-2, and 1b-6 were used instead of Dye Compound 1a-1.

Comparative Ink Preparation Experiments 1 to 3

Comparative Inks L to N were prepared in the same manner as that described in Ink Preparation Experiment 1 except that Comparative Dye Compounds 9, 10, 11 represented by the following formulas (9), (10), and (11), respectively, were used instead of Dye Compound 1a-1:

Formula (9)

(9)

Formula (10)

Formula (11)

Figure 2:
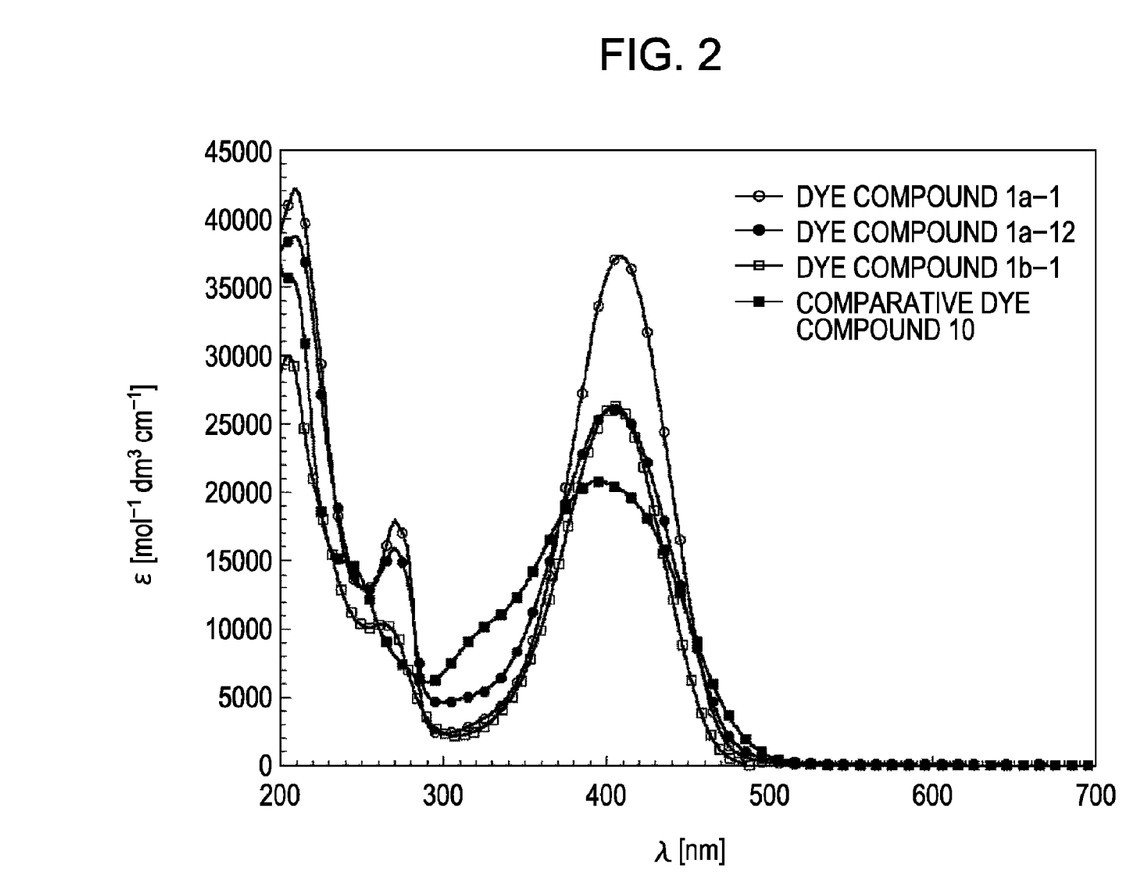
FIG. 2 is a graph showing the ultraviolet-visible absorption spectra of Dye Compounds 1a-1, 1a-12, and 1b-1 and Comparative Dye Compound 10 in water at 23° C.

FIG. 2 shows the ultraviolet-visible absorption spectra of Dye Compounds 1a-1, 1a-12, and 1b-1 and Comparative Dye Compound 10 in water at 23° C.

Evaluation

Inks A to K, which were prepared in Ink Preparation Experiments 1 to 11, and Comparative Inks L to N, which were prepared in Comparative Ink Preparation Experiments 1 to 3 were each loaded into an ink cartridge for an ink jet recording apparatus, Pixus iP8600, available from CANON KABUSHIKI KAISHA. Solid images were printed on sheets of glossy photo paper, professional photo paper PR-101, available from CANON KABUSHIKI KAISHA using the ink jet recording apparatus equipped with the ink cartridge, whereby records were prepared. The records were naturally dried for 24 hours and then evaluated.

Light Resistance

One of the records was placed into a weather meter, Atlas Weather-Ometer Ci4000, available from Toyo Seiki Seisaku-sho, Ltd. and then exposed for 50 hours under the following conditions: a black panel temperature of 50° C., a chamber temperature of 40° C., a relative humidity of 70%, and an irradiance of 0.39 W/m² at a wavelength of 340 nm. This record was analyzed for color density and chromaticity ($L^*$, $a^*$, $b^*$) in the $L^*a^*b^*$ color system using an instrument, SpectroLino, available from GretagMacbeth before and after exposure. The color difference ($\Delta E$) of this record was calculated from the following equation on the basis of measurements of color properties:

Color difference($\Delta E$)=$\sqrt{\{((L^*\text{ of this record unexposed})-(L^*\text{ of this record exposed}))^2 + ((a^*\text{ of this record unexposed})-(a^*\text{ of this record exposed}))^2 + ((b^*\text{ of this record unexposed})-b^*\text{ of this record exposed}))^2\}}$.

This record was evaluated in accordance with standards below.
A: a record with a color difference of less than five
B: a record with a color difference of five to less than ten
C: a record with a color difference of ten or more Gas Resistance Another one of the records was exposed to an atmosphere having an ozone concentration of 10 ppm and a relative humidity of 60% at 24° C. for four hours using an ozone weather meter, OMS-H, available from Suga Test Instruments Co. This record was analyzed for reflection density before and after exposure and then evaluated in the same manner as that described above. The color difference ($\Delta E$) of this record was calculated from the following equation on the basis of measurements of color properties:

Color difference($\Delta E$)=$\{((L^*\text{ of this record unexposed})-(L^*\text{ of this record exposed}))^2 + ((a^*\text{ of this record unexposed})-(a^*\text{ of this record exposed}))^2 + ((b^*\text{ of this record unexposed})-b^*\text{ of this record exposed}))^2\}$.

This record was evaluated in accordance with standards below.
A: a record with a color difference of less than five
B: a record with a color difference of five to less than ten
C: a record with a color difference of ten or more Storage Stability Inks A to K, which were prepared in Ink Preparation Experiments 1 to 11, and Comparative Inks L to N, which were prepared in Comparative Ink Preparation Experiments 1 to 3 were each poured into a glass vessel, which was then sealed. The glass vessel was left at 60° C. for one month. The ink in the glass vessel was measured for absorbance at a maximum absorption wavelength before and after being left at 60° C. for one month.

Inks A to K and Comparative Inks L to N were evaluated in accordance with standards below.
A: an ink with an $Abs/Abs_0$ ratio of 0.95 or more
B: an ink with an $Abs/Abs_0$ ratio of 0.90 to less than 0.95
C: an ink with an $Abs/Abs_0$ ratio of less than 0.90

In these standards, Abs represents the absorbance of each ink not yet left at 60° C. for one month and $Abs_0$ represents the absorbance of the ink left at 60° C. for one month.

The evaluation results of Inks A to K and Comparative Inks L to N are summarized in Table 3.

TABLE 3

| Ink | Compounds | Light resistance | Gas resistance | Storage stability |
|---|---|---|---|---|
| (A) | Dye compound 1a-1 | A | A | A |
| (B) | Dye compound 1a-2 | A | A | A |
| (C) | Dye compound 1a-5 | A | A | A |
| (D) | Dye compound 1a-6 | A | A | A |
| (E) | Dye compound 1a-9 | A | A | A |
| (F) | Dye compound 1a-10 | B | B | A |
| (G) | Dye compound 1a-11 | A | B | A |
| (H) | Dye compound 1a-12 | A | A | A |
| (I) | Dye compound 1b-1 | A | A | A |
| (J) | Dye compound 1b-2 | B | B | A |
| (K) | Dye compound 1b-6 | B | A | A |
| (L) | Comparative dye compound 9 | B | B | C |
| (M) | Comparative dye compound 10 | C | C | A |
| (N) | Comparative dye compound 11 | C | B | A |

As is clear from Table 3, Inks A to K have good light resistance, gas resistance, and storage stability. This confirms that Dye Compound 1a-1, 1a-2, 1a-5, 1a-6, 1a-9 to 1a-12, 1b-1, 1b-2, and 1b-6 are suitable for use in inks.

Thus, the present invention provides a dye compound having excellent weather resistance such as resistance to light and gas. Furthermore, the present invention provides an ink, suitable for ink jet use, having good storage stability.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-139677 filed May 28, 2008, which is hereby incorporated by reference herein in its entirety.

What is claimed is:

1. A dye compound represented by the following formula, comprising:
at least one anionic group:

Formula (1)

(1)

wherein $R_1$ and $R_2$ independently represent an amino or hydroxyl group, $A_1$ represents nitrogen or $CR_4$, $R_4$ and $R_3$ form a first aromatic ring, $R_3$ represents a substituent with a negative Hammett's substituent constant when $A_1$ represents nitrogen, and Cy represents a second aromatic ring.

2. The dye compound according to claim 1, wherein $R_1$ and $R_2$ in Formula (1) represent a hydroxy group and an amino group, respectively.

3. The dye compound according to claim 1, wherein $A_1$ and $R_3$ in Formula (1) represent nitrogen and an amino group, respectively.

4. The dye compound according to claim 1, wherein $R_1$ and $R_2$ in Formula (1) each represent a hydroxy group.

5. The dye compound according to claim 1, wherein the anionic group is a carboxyl or sulfo group.

6. The dye compound according to claim 1, wherein the first aromatic ring has a sulfo group.

7. The dye compound according to claim 1, wherein the second aromatic ring has a carboxyl or sulfo group.

8. The dye compound according to claim 1, wherein the second aromatic ring has an azo group and a carboxyl or sulfo group adjacent to the azo group.

9. The dye compound according to claim 1, wherein the second aromatic ring is a nitrogen-containing heteroaromatic ring.

10. The dye compound according to claim 1, wherein the second aromatic ring is a five-membered nitrogen-containing heteroaromatic ring.

11. An ink containing:
an aqueous medium and
the dye compound according to claim 1.

12. The ink according to claim 11 for ink jet use.

* * * * *